(12) United States Patent
Ueda

(10) Patent No.: US 8,942,952 B2
(45) Date of Patent: Jan. 27, 2015

(54) ROTATION ANGLE DETECTION APPARATUS

(75) Inventor: Takeshi Ueda, Kashiba (JP)

(73) Assignee: Jtekt Corporation, Osaka (JP)

( * ) Notice: Subject to any disclaimer, the term of this patent is extended or adjusted under 35 U.S.C. 154(b) by 509 days.

(21) Appl. No.: 13/408,415

(22) Filed: Feb. 29, 2012

(65) Prior Publication Data

US 2012/0232839 A1 Sep. 13, 2012

(30) Foreign Application Priority Data

Mar. 9, 2011 (JP) .................................. 2011-051637

(51) Int. Cl.
*G01B 7/30* (2006.01)
*G06F 19/00* (2011.01)
*G01D 5/244* (2006.01)
*G01D 5/245* (2006.01)

(52) U.S. Cl.
CPC .......... *G01D 5/24471* (2013.01); *G01D 5/2451* (2013.01)
USPC .................. 702/151; 324/207.25; 324/207.22

(58) Field of Classification Search
None
See application file for complete search history.

(56) References Cited

U.S. PATENT DOCUMENTS

| 7,170,279 | B2 | 1/2007 | Haas et al. | |
|---|---|---|---|---|
| 2006/0077083 | A1* | 4/2006 | Kiriyama et al. | 341/120 |
| 2007/0108969 | A1* | 5/2007 | Kurimoto et al. | 324/207.25 |
| 2007/0273363 | A1* | 11/2007 | Kurimoto et al. | 324/177 |
| 2010/0052664 | A1* | 3/2010 | Nishizawa et al. | 324/207.25 |
| 2010/0321008 | A1* | 12/2010 | Mita et al. | 324/207.25 |
| 2012/0139532 | A1* | 6/2012 | Ueda et al. | 324/207.22 |
| 2012/0143563 | A1* | 6/2012 | Ueda | 702/151 |
| 2012/0158340 | A1* | 6/2012 | Ueda | 702/94 |
| 2012/0158341 | A1* | 6/2012 | Ueda et al. | 702/94 |
| 2012/0182008 | A1* | 7/2012 | Ueda et al. | 324/207.25 |
| 2012/0182009 | A1* | 7/2012 | Ueda | 324/207.25 |

FOREIGN PATENT DOCUMENTS

| EP | 1 647 811 A1 | 4/2006 |
|---|---|---|
| JP | A-06-109750 | 4/1994 |
| JP | A-2008-283762 | 11/2008 |

OTHER PUBLICATIONS

Oct. 7, 2014 Search Report issued in European Application No. 12158124.3.

* cited by examiner

*Primary Examiner* — Eliseo Ramos-Feliciano
*Assistant Examiner* — Seokjin Kim
(74) *Attorney, Agent, or Firm* — Oliff PLC

(57) ABSTRACT

A first third harmonic component removing portion calculates an approximate value $(\sin \theta)_n$ of a signal $\sin \theta$ that is an output signal of a first magnetic sensor from which third harmonic components have been removed. A second third harmonic component removing portion calculates an approximate value $(\cos \theta)_n$ of a signal $\cos \theta$ that is an output signal of a second magnetic sensor from which third harmonic components have been removed. A rotation angle calculation portion calculates a rotation angle $\theta$ of a rotor based on the approximate value $(\sin \theta)_n$ of $\sin \theta$, which has been calculated by the first third harmonic component removing portion and the approximate value $(\cos \theta)_n$ of $\cos \theta$, which has been calculated by the second third harmonic component removing portion.

6 Claims, 3 Drawing Sheets

ROTATION ANGLE DETECTION APPARATUS

INCORPORATION BY REFERENCE

The disclosure of Japanese Patent Applications No. 2011-051637 filed on Mar. 9, 2011 including the specification, drawings and abstract, is incorporated herein by reference in its entirety.

BACKGROUND OF THE INVENTION

1. Field of the Invention

The invention relates to a rotation angle detection apparatus that detects a rotation angle of a rotor.

2. Description of Related Art

A brushless motor that is used in, for example, an electric power steering system is controlled by supplying currents to stator coils in accordance with the rotation angle of a rotor. For example, rotation angle detection apparatuses, such as the one illustrated in FIGS. 3A and 3B, are known. The illustrated rotation angle detection apparatus includes a detection rotor 1 that rotates as a rotor of a brushless motor rotates, and two magnetic sensors 11 and 12 that are arranged apart from each other at an angular interval of 90° about the rotation axis of the detection rotor 1. The detection rotor 1 includes two magnets 2 each of which has two magnetic poles. The magnetic sensors 11 and 12 output sinusoidal signals of which the phases are different from each other by 90°. The rotation angle of the detection rotor 1 is detected based on the two sinusoidal signals (for example, refer to Japanese Patent Application Publication No. 06-109750 (JP 06-109750 A) and Japanese Patent Application Publication No. 2008-283762 (JP 2008-283762 A)).

The arrow in FIG. 3A indicates the normal rotation direction of the detection rotor 1. As the detection rotor 1 rotates in the normal rotation direction, the rotation angle of the detection rotor 1 increases. On the other hand, as the detection rotor 1 rotates in the reverse rotation direction, the rotation angle of the detection rotor 1 decreases. If the rotation angle (electric angle) of the detection rotor 1 is θ, an output signal V1 of the first magnetic sensor 11 (will hereinafter be referred to as "the first output signal V1"), which is one of the two magnetic sensors, is expressed as $V1 = A1 \cdot \sin\theta$, and an output signal V2 of the second magnetic sensor 12 (will hereinafter be referred to as "the second output signal V2"), which is the other of the two magnetic sensors, is expressed as $V2 = A2 \cdot \sin(\theta + 90°) = A2 \cdot \cos\theta$. In these equations, A1 and A2 each represent an amplitude.

If the amplitudes A1 and A2 are both regarded as a prescribed value A, or if the first and second output signals V1 and V2 are normalized such that the amplitudes A1 and A2 both become the prescribed value A, the first output signal V1, which is one of the two output signals, is expressed as $V1 = A \cdot \sin\theta$, and the second output signal V2, which is the other of the two output signals, is expressed as $V2 = A \cdot \cos\theta$. Further, if A is 1, the first output signal V1 is expressed as $V1 = \sin\theta$ and the second output signal V2 is expressed as $V2 = \cos\theta$. Thus, for simpler descriptions, the first output signal V1 of the first magnetic sensor 11 and the second output signal V2 of the second magnetic sensor 12 will be expressed as $V1 = \sin\theta$ and $V2 = \cos\theta$, respectively. FIG. 4 is a graph illustrating the waveforms of the first and second output signals V1 and V2.

The rotation angle θ of the rotor 1 is determined using the first and second output signals V1 and V2, according to, for example, Equation 1 shown below.

$$\theta = \tan^{-1}(\sin\theta / \cos\theta) \quad \text{Equation 1}$$
$$= \tan^{-1}(V1 / V2)$$

In the conventional rotation angle detection apparatus as described above, if the gap between the first magnetic sensor 11 and the rotor 1 and the gap between the second magnetic sensor 12 and the rotor 1 are small, third harmonic components are superimposed on the first output signal V1 of the first magnetic sensor 11 and the second output signal V2 of the second magnetic sensor 12, causing distortion of the waveforms of the first and second output signals V1 and V2. For example, as shown in FIG. 5, the smaller the gap D (refer to FIG. 3B) between the first magnetic sensor 11 and the detection rotor 1, the larger the distortion of the first output signal V1 of the first magnetic sensor 11. In a case where the first output signal V1 of the first magnetic sensor 11 and the second output signal V2 of the second magnetic sensor 12 are distorted as in this example case, the rotation angle θ calculated based on the first and second output signals V1 and V2 may have a calculation error.

SUMMARY OF THE INVENTION

It is an object of the invention to provide a rotation angle detection apparatus that is capable of accurately detecting the rotation angle of a rotor even if third harmonic components are superimposed on output signals of magnetic sensors.

An aspect of the invention relates to a rotation angle detection apparatus, including: a magnet that rotates as a rotor rotates, and that has multiple magnetic poles arranged in a circumferential direction of the magnet; a first magnetic sensor that outputs, as the magnet rotates, a sinusoidal signal on which a third harmonic component is superimposed; a second magnetic sensor that outputs, as the magnet rotates, a sinusoidal signal on which a third harmonic component is superimposed and of which a phase is different from a phase of the sinusoidal signal output from the first magnetic sensor; a third harmonic component removing unit that corrects the sinusoidal signals output from the first magnetic sensor and the second magnetic sensor so as to remove the third harmonic components from the sinusoidal signals; and a rotation angle calculating unit that calculates a rotation angle of the rotor based on the sinusoidal signals corrected by the third harmonic component removing unit. The third harmonic component removing unit includes: a unit that calculates a post-correction signal V1a of the sinusoidal signal output from the first magnetic sensor according to an equation a; and a unit that calculates a post-correction signal V2a of the sinusoidal signal output from the second magnetic sensor according to an equation b.

$$V1a = V1 \cdot \frac{1}{1 + \frac{4K}{1-K} \cdot (1 - V1b^2)} \quad (a)$$

$$V2a = V2 \cdot \frac{1}{1 + \frac{4K}{1-K} \cdot (1 - V2b^2)} \quad (b)$$

In the equation a and the equation b, K is a third harmonic component gain that is larger than zero but smaller than 1 (0<K<1), V1 is the sinusoidal signal output from the first magnetic sensor, V1a is the post-correction signal that is obtained by correcting the output signal V1 using the third harmonic component removing unit, V1*b* is a pre-correction signal that is the output signal V1 before correction, V2 is the sinusoidal signal output from the second magnetic sensor, V2*a* is the post-correction signal that is obtained by correcting the output signal V2 using the third harmonic component removing unit, and V2*b* is a pre-correction signal that is the output signal V2 before correction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3A shows the conventional rotation angle detection apparatus as viewed in the axial direction of a detection rotor of the rotation angle detection apparatus, and FIG. 3B is a plan view of the conventional rotation angle detection apparatus;

DETAILED DESCRIPTION OF EMBODIMENTS

Figure 1:
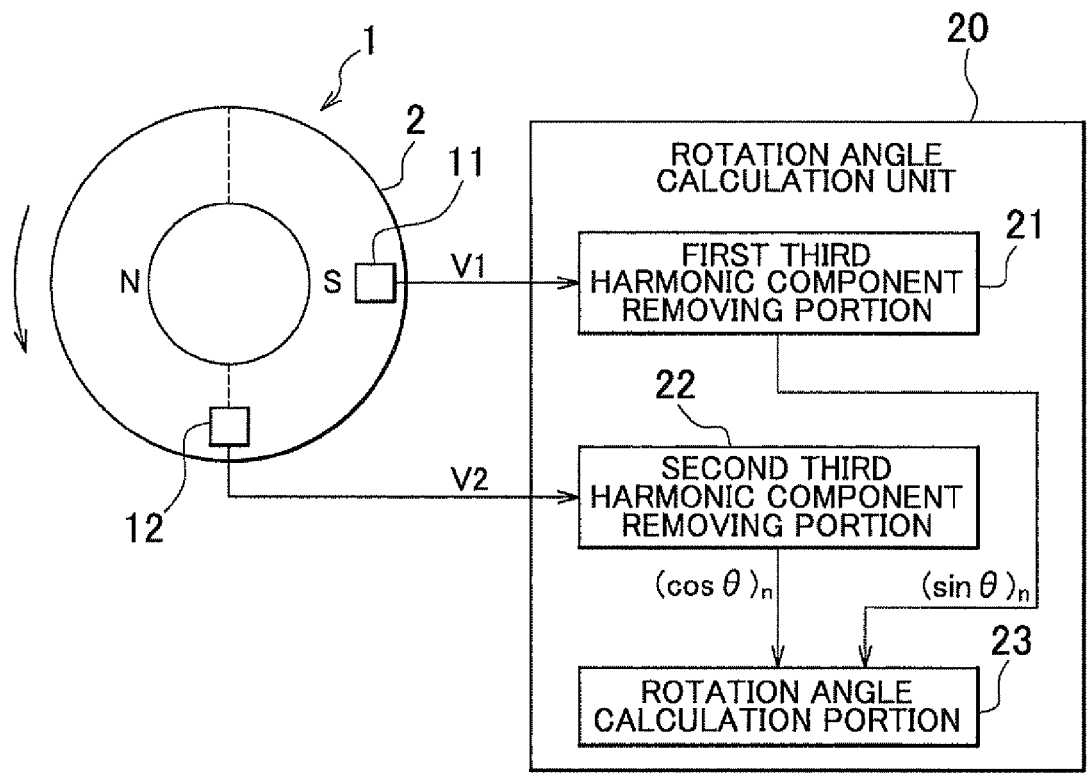
FIG. 1 is a view schematically showing the configuration of a rotation angle detection apparatus according to an example embodiment of the invention.

In the following, an example embodiment of the invention will be described in detail with reference to the accompanying drawings. In the example embodiment, the invention is applied to a rotation angle detection apparatus that detects the rotation angle of a rotor of a brushless motor. FIG. 1 is a view schematically showing the configuration of a rotation angle detection apparatus according to the example embodiment of the invention. The rotation angle detection apparatus may be used, for example, to detect the rotation angle of a rotor of a brushless motor of an electric power steering system. The rotation angle detection apparatus includes, for example, a detection rotor 1 (will hereinafter be simply referred to as "rotor 1") that rotates as the brushless motor rotates. The rotor 1 has a cylindrical magnet 2 having at least one magnetic pole pair. In this example embodiment, the magnet 2 has one magnetic pole pair. That is, the magnet 2 has two magnetic poles, that is, an N pole and an S pole, which are equiangularly arranged.

There are provided two magnetic sensors 11 and 12 which are opposed to an annular end face of the magnet 2, which is a part of one of end faces of the rotor 1, orthogonal to the rotation axis of the rotor 1. The magnetic sensors 11 and 12 are arranged so as to be apart from each other at an angular interval of 90° (electric angle) about the rotation axis of the rotor 1. These magnetic sensors 11 and 12 may each be, for example, a magnetic sensor that includes an element of which the electric characteristics change under the influence of a magnetic field, such as a Hall element and a magnetoresistance element (MR element). It is to be noted that one of the two magnetic sensors will be referred to as "the first magnetic sensor 11" where necessary, while the other of the two magnetic sensors will be referred to as "the second magnetic sensor 12" where necessary.

The arrow in FIG. 1 indicates the normal rotation direction of the rotor 1. As the rotor 1 rotates in the normal rotation direction, the rotation angle of the rotor 1 increases. On the other hand, as the rotor 1 rotates in the reverse rotation direction, the rotation angle of the rotor 1 decreases. If the rotation angle (electric angle) of the rotor 1 is 0, in a state where third harmonic components are superimposed on neither an output signal V1 of the first magnetic sensor 11 (will hereinafter be referred to as "the first output signal V1" where necessary) nor an output signal V2 of the second magnetic sensor 12 (will hereinafter be referred to as "the second output signal V2" where necessary), the first output signal V1 of the first magnetic sensor 11 is expressed as $V1 = A1 \cdot \sin\theta$, and the second output signal V2 of the second magnetic sensor 12 is expressed as $V2 = A2 \cdot \sin(\theta + 90°) = A2 \cdot \cos\theta$. In these equations, A1 and A2 each represent an amplitude. If the amplitudes A1 and A2 are both regarded as a prescribed value A, or if the output signals V1 and V2 are normalized such that the amplitudes A1 and A2 both become the prescribed value A, the first output signal V1 of the first magnetic sensor 11 is expressed as $A \cdot \sin\theta$, and the second output signal V2 of the second magnetic sensor 12 is expressed as $A \cdot \cos\theta$. When the prescribed value A is 1 (A=1), the first output signal V1 is expressed as $\sin\theta$ and the second output signal V2 is expressed as $\cos\theta$. Therefore, in a situation where third harmonic components are superimposed on neither the first output signal V1 nor the second output signal V2, the first output signal V1 that is expressed as $V1 = \sin\theta$ is output from the first magnetic sensor 11 and the second output signal V2 that is expressed as $V2 = \cos\theta$ is output from the second magnetic sensor 12.

In this example embodiment, because the gap between the first magnetic sensor 11 and the magnet 2 and the gap between the second magnetic sensor 12 and the magnet 2 are small, third harmonic components are superimposed on the first output signal V1 of the first magnetic sensor 11 and the second output signal V2 of the second magnetic sensor 12. Therefore, in this example embodiment, the first output signal V1 expressed as Equation 2 below is output from the first magnetic sensor 11 and the second output signal V2 expressed as Equation 3 below is output from the second magnetic sensor 12. It is to be noted that K in Equations 3 and 3 below represents a gain K (0<K<1) of third harmonic components.

$$V1 = \frac{\sin\theta + K \cdot \sin 3\theta}{1 - K} \quad (2)$$
$$= \frac{\sin\theta + K \cdot (3\sin\theta - 4\sin^3\theta)}{1 - K}$$
$$V2 = \frac{\cos\theta - K \cdot \cos 3\theta}{1 - K} \quad (3)$$
$$= \frac{\cos\theta - K \cdot (4\cos^3\theta - 3\cos\theta)}{1 - K}$$
$$= \frac{\cos\theta + K \cdot (3\cos\theta - 4\cos^3\theta)}{1 - K}$$

The first output signal V1 and the second output signal V2 are input into a rotation angle calculation unit 20. The rotation angle calculation unit 20 calculates the rotation angle θ of the rotor 1 based on the first output signal V1 and the second output signal V2. The rotation angle calculation unit 20 is constituted of, for example, a microcomputer including a CPU (Central Processing Unit) and memories, such as a ROM (Read Only Memory) and a RAM (Random Access Memory). The rotation angle calculation unit 20 serves as multiple function processing portions (elements) when the CPU executes given programs stored in the ROM. The multiple function processing portions (elements) include a first third harmonic component removing portion 21 (an example of "third harmonic component removing unit"), a second third harmonic component removing portion 22 (another example of "third harmonic component removing unit"), and a rotation angle calculation portion 23 (an example of "rotation angle calculating unit").

The first third harmonic component removing portion 21 corrects the first output signal V1 so as to remove the third harmonic components from the first output signal V1. More specifically, at this time, the first third harmonic component removing portion 21 calculates an approximate value $(\sin\theta)_n$ of a signal $\sin\theta$ that is the first output signal V1 of the first magnetic sensor 11 from which the third harmonic components have been removed. The second third harmonic component removing portion 22 corrects the second output signal V2 so as to remove the third harmonic components from the second output signal V2. More specifically, the second third harmonic component removing portion 22 calculates an approximate value $(\cos\theta)_n$ of a signal $\cos\theta$ that is the second output signal V2 of the second magnetic sensor 12 from which the third harmonic components have been removed.

The rotation angle calculation portion 23 calculates the rotation angle $\theta$ of the rotor 1 based on the approximate value $(\sin\theta)_n$ of the signal $\sin\theta$, which has been calculated by the first third harmonic component removing portion 21, and the approximate value $(\cos\theta)_n$ of the signal $\cos\theta$, which has been calculated by the second third harmonic component removing portion 22. More specifically, the rotation angle calculation portion 23 calculates the rotation angle $\theta$ of the rotor 1 based on Equation 4 shown below.

$$\theta = \tan^{-1}\{(\sin\theta)_n / (\cos\theta)_n\} \quad \text{Equation 4}$$

In the following, the processings executed by the first third harmonic component removing portion 21 and the second third harmonic component removing portion 22 will be described.

First, the processing executed by the first third harmonic component removing portion 21 will be described. Equation 5 shown below is obtained by transforming Equation 2.

$$\sin\theta = V1 \cdot \frac{1}{1 + \frac{4K}{1-K} \cdot (1 - \sin^2\theta)} \quad (5)$$

Equation 6 is a set of equations that are used to calculate, based on Equation 5, the approximate value $(\sin\theta)_n$ of the signal $\sin\theta$ that is the first output signal V1 of the first magnetic sensor 11 from which the third harmonic components have been removed.

$$(\sin\theta)_1 = V1 \cdot \frac{1}{1 + \frac{4K}{1-K} \cdot (1 - V1^2)} \quad (6)$$

$$(\sin\theta)_2 = V1 \cdot \frac{1}{1 + \frac{4K}{1-K} \cdot \{1 - (\sin\theta)_1^2\}}$$

$$\vdots$$

$$(\sin\theta)_n = V1 \cdot \frac{1}{1 + \frac{4K}{1-K} \cdot \{1 - (\sin\theta)_{n-1}^2\}}$$

As shown in Equation 6 above, an approximate value $(\sin\theta)_1$ of $\sin\theta$ in the first calculation cycle is calculated using the first output signal V1 of the first magnetic sensor 11 as $\sin\theta$ in the term $(1-\sin^2\theta)$ in the right side of Equation 5. Further, the approximate value $(\sin\theta)_2$ of $\sin\theta$ in the second calculation cycle is calculated using the approximate value $(\sin\theta)$ of $\sin\theta$ calculated in the first calculation cycle as $\sin\theta$ in the term $(1-\sin^2\theta)$ in the right side of Equation 5. That is, if the number of calculation cycles is n (n is an integer that is equal to or larger than 1), the approximate value $(\sin\theta)_n$ of $\sin\theta$ calculated in each of the second calculation cycle and the following calculation cycles is calculated using an approximate value $(\sin\theta)_{n-1}$ of $\sin\theta$ calculated in the immediately preceding calculation cycle as $\sin\theta$ in the term $(1-\sin^2\theta)$ in the right side of Equation 5. It is to be noted that the larger the calculation cycle number n, the higher the accuracy of the approximate value obtained.

The first third harmonic component removing portion 21 calculates a signal value $(\sin\theta)_n$ of $\sin\theta$ in the nth calculation cycle by executing the calculation described above for n times. It is to be noted the calculation cycle number n may be set to any value. That is, n may one or may be two or more. In this example embodiment, the calculation cycle number n is set to 2 or 3. Next, the processing executed by the second third harmonic component removing portion 22 will be described.

Equation 7 is obtained by transforming Equation 3 shown above.

$$\cos\theta = V2 \cdot \frac{1}{1 + \frac{4K}{1-K} \cdot (1 - \cos^2\theta)} \quad (7)$$

Equation 8 is used to calculate, based on Equation 7, the approximate value $(\cos\theta)_n$ of the signal $\cos\theta$ that is the second output signal V2 of the second magnetic sensor 12 from which the third harmonic components have been removed.

$$(\cos\theta)_1 = V2 \cdot \frac{1}{1 + \frac{4K}{1-K} \cdot (1 - V2^2)} \quad (8)$$

$$(\cos\theta)_2 = V2 \cdot \frac{1}{1 + \frac{4K}{1-K} \cdot \{1 - (\cos\theta)_1^2\}}$$

$$\vdots$$

$$(\cos\theta)_n = V2 \cdot \frac{1}{1 + \frac{4K}{1-K} \cdot \{1 - (\cos\theta)_{n-1}^2\}}$$

As is known from Equation 8 shown above, an approximate value $(\cos\theta)_1$ of the signal $\cos\theta$ in the first calculation cycle is calculated using the second output signal V2 of the second magnetic sensor 12 as $\cos\theta$ in the term $(1-\cos^2\theta)$ in the right side of Equation 7. Further, an approximate value $(\cos\theta)_2$ of $\cos\theta$ in the second calculation cycle is calculated using the approximate value $(\cos\theta)_1$ calculated in the first calculation cycle as $\cos\theta$ in the term $(1-\cos^2\theta)$ in the right side of Equation 7. That is, if the number of calculation cycles is n (n is an integer that is equal to or larger than 1), the approximate value $(\cos \theta)_n$ of $\cos \theta$ calculated in each of the second calculation cycle and the following calculation cycles is calculated using an approximate value $(\cos \theta)_{n-1}$ of $\cos \theta$ calculated in the immediately preceding calculation cycle as $\cos \theta$ in the term $(1-\cos^2 \theta)$ in the right side of Equation 7. It is to be noted that the larger the calculation cycle number n, the higher the accuracy of the approximate value obtained.

Figure 2:
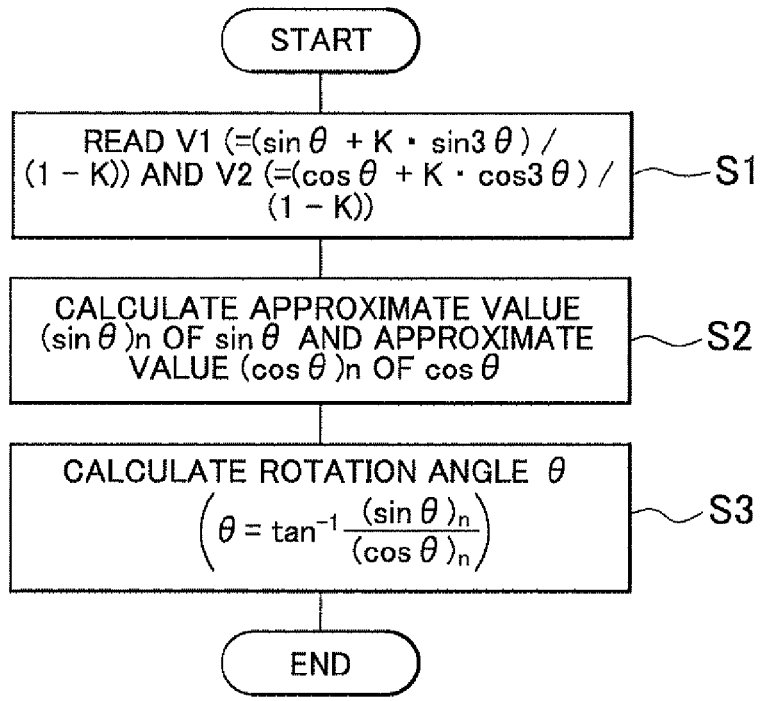
FIG. 2 is a flowchart illustrating the procedure of a rotation angle calculation routine that is executed by a rotation angle calculation unit.
Figure 3A:
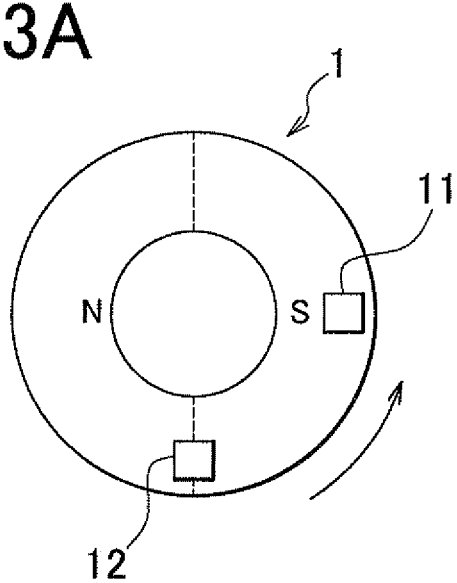
FIGS. 3A and 3B are views for explaining a rotation angle detection method that is executed by a conventional rotation angle detection apparatus, where
Figure 3B:
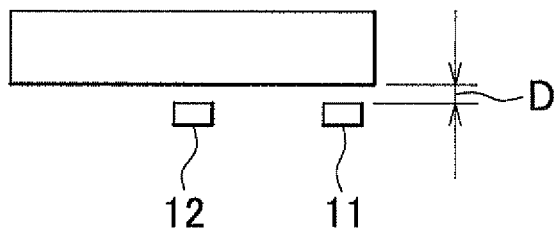
Figure 4:
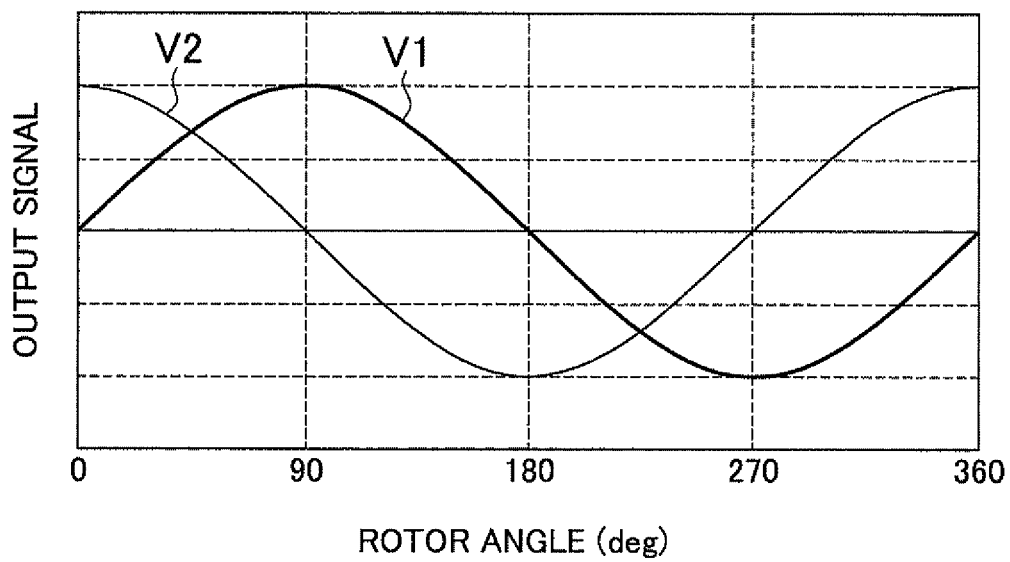
FIG. 4 is a graph showing waveforms of output signals of magnetic sensors.
Figure 5:
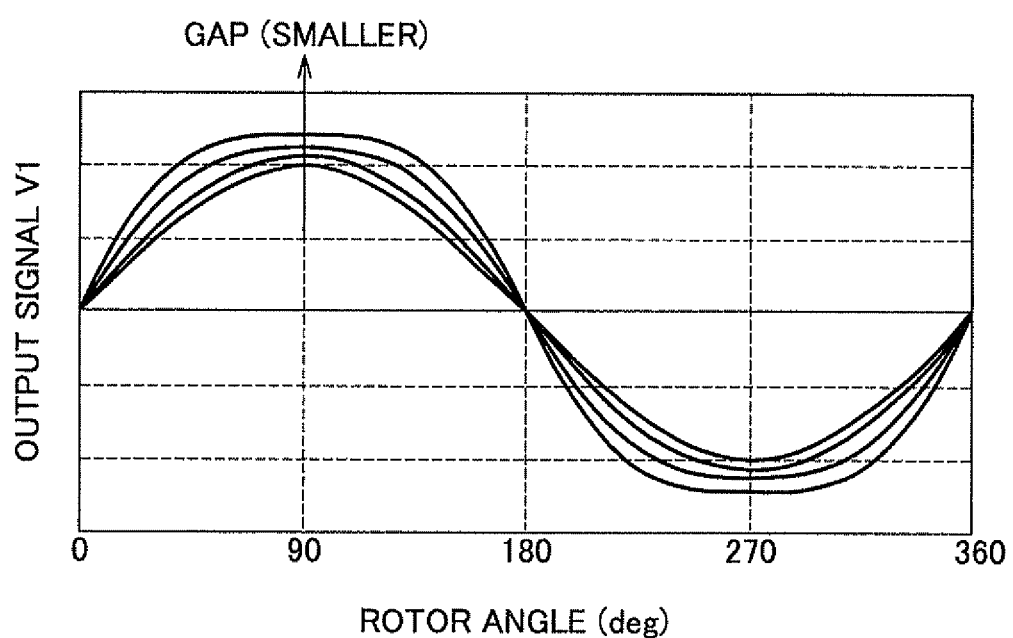
FIG. 5 is a waveform diagram showing examples of waveforms of an output signal of a first magnetic sensor, on which third harmonic components are superimposed.

The second third harmonic component removing portion 22 calculates a signal value $(\cos \theta)_n$ in the nth calculation cycle by executing the calculation described above for n times. It is to be noted that the calculation cycle number n may be set to any value. That is, n may one, or may be two or more. In this example embodiment, the calculation cycle number n is set to 2 or 3. FIG. 2 is a flowchart illustrating the procedure of the rotation angle calculation routine that is executed by the rotation angle calculation unit 20. The rotation angle calculation routine illustrated in FIG. 2 is repeatedly executed at given calculation intervals.

Referring to the flowchart in FIG. 2, the rotation angle calculation unit 20 firsts reads the first output signal V1 of the first magnetic sensor 11 and the second output signal V2 of the second magnetic sensor 12 (step S1). After this, the rotation angle calculation unit 20 removes the third harmonic components from the output signals V1 and V2 read in step S1 (step S2). More specifically, at this time, the first third harmonic component removing portion 21 calculates the approximate value $(\sin \theta)_n$ of the signal $\sin \theta$ that is the first output signal V1 from which the third harmonic components have been removed. Further, the second third harmonic component removing portion 22 calculates the approximate value $(\cos \theta)_n$ of the signal $\cos \theta$ that is the second output signal V2 from which the third harmonic components have been removed.

The rotation angle calculation portion 23 of the rotation angle calculation unit 20 calculates the rotation angle $\theta$ of the rotor 1 using the approximate value $(\sin \theta)_n$ of $\sin \theta$, which has been calculated by the first third harmonic component removing portion 21, and the approximate value $(\cos \theta)_n$ of $\cos \theta$, which has been calculated by the second third harmonic component removing portion 22, according to Equation 4 (step S3). Then, the present cycle of the rotation angle calculation routine is finished. According to this example embodiment, because the signal value that is the first output signal V1 of the first magnetic sensor 11 from which the third harmonic components have been removed and the signal value that is the second output signal V2 of the second magnetic sensor 12 from which the third harmonic components have been removed are approximately calculated, even if third harmonic components are superimposed on the first output signal V1 of the first magnetic sensor 11 and the second output signal V2 of the second magnetic sensor 12, the rotation angle of the rotor 1 is accurately calculated. In this way, even if the gap between the first magnetic sensor 11 and the magnet 2 and the gap between the second magnetic sensor 12 and the magnet 2 are small, the rotation angle of the rotor 1 is calculated with high accuracy. As a result, the gap between the first magnetic sensor 11 and the magnet 2 and the gap between the second magnetic sensor 12 and the magnet 2 are made smaller, which contributes to size reduction of a rotation angle detection apparatus.

While the example embodiment of the invention has been described above, the invention may be embodied in various other embodiments. For example, the method for calculating the rotation angle $\theta$ of the rotor 1 based on the approximate value $(\sin \theta)_n$ of $\sin \theta$ and the approximate value $(\cos \theta)_n$ of $\cos \theta$ is not limited to the above-described method using Equation 4. Further, if $4K/(1-K)$ in Equations 6 and 8 is regarded as a correction gain G, the correction gain G may either be constant or be calculated based on the approximate value $(\sin \theta)_{n-1}$ of $\sin \theta$ calculated in the immediately preceding calculation cycle and the approximate value $(\cos \theta)_{n-1}$ of $\cos \theta$ calculated in the immediately preceding calculation cycle. In this case, for example, the correction gain $G_n$ that is used when the approximate values $(\sin \theta)_n$ and $(\cos \theta)_n$ in the nth calculation cycle are calculated may be calculated based on the approximate value $(\sin \theta)_{n-1}$ of $\sin \theta$ calculated in the (n−1)th calculation cycle and the approximate value $(\cos \theta)_{n-1}$ of $\cos \theta$ calculated in the (n−1)th calculation cycle. At this time, more specifically, the correction gain $G_n$ may be calculated based on the value at the point which corresponds to the rotation angle $\theta$ of 45° and at which the sinusoidal curve of the approximate value $(\sin \theta)_{n-1}$ of $\sin \theta$ calculated in the (n−1)th calculation cycle and the sinusoidal curve of the approximate value $(\cos \theta)_{n-1}$ of $\cos \theta$ calculated in the (n−1)th calculation cycle intersect with each other.

Further, when the approximate value $(\sin \theta)$ of $\sin \theta$ calculated in the (n−1)th cycle and the approximate value $(\cos \theta)_{n-1}$ of $\cos \theta$ calculated in the (n−1)th cycle contain third harmonic components, $(\sin \theta)_{n-1}^2 + (\cos \theta)_{n-1}^2$ is not 1 $((\sin \theta)_{n-1}^2 + (\cos \theta)_{n-1}^2 \ne 1)$. Therefore, the correction gain $(4K/(1-K))$ that is used when the approximate values $(\sin \theta)_n$ and $(\cos \theta)_n$ in the nth calculation cycle are calculated may be calculated according to Equation 9 shown below.

$$G_n = G_{n-1} + \alpha \times [1 - \{(\sin \theta)_{n-1}^2 + (\cos \theta)_{n-1}^2\}] \qquad \text{Equation 9}$$

In Equation 9 above, $G_n$ is the correction gain that is used in the nth approximate value calculation cycle, and $G_{n-1}$ is the correction gain that is used in the (n−1)th approximate value calculation cycle, and $\alpha$ is a predetermined constant.

As described above, by adjusting the correction gain G, it is possible to cope with a change in time in the gap between the first magnetic sensor 11 and the magnet 2, a change in time in the gap between the second magnetic sensor 12 and the magnet 2, and individual differences among products (rotation angle detection apparatuses). As a result, it is possible to calculate the rotation angle of the rotor 1 with high accuracy.

In the example embodiment described above, the first magnetic sensor 11 and the second magnetic sensor 12 are arranged so as to be apart from each other at an angular interval (electric angle) of 90° about the rotation axis of the rotor 1. However, the angular interval between the first magnetic sensor 11 and the second magnetic sensor 12 is not limited 90°. That is, the angular interval may be set to any desired angle (electric angle), for example, 120°. Hereinafter, description will be made on the processings that are executed by the first third harmonic component removing portion 21 and the second third harmonic component removing portion 22 when the first magnetic sensor 11 and the second magnetic sensor 12 are arranged so as to be apart from each other at a desired angular interval. If K (0<K<1) is a gain of third harmonic components, the output signal of the first magnetic sensor 11 is the first output signal V1, the signal obtained by correcting the first output signal V1 using the first third harmonic component removing portion 21 is V1a, and the first output signal V1 before correction is V1b, the first third harmonic component removing portion 21 calculates the corrected signal V1a according to Equation 10 shown below. Further, if the output signal of the second magnetic sensor 12 is the second output signal V2, the signal obtained by correcting the second output signal V2 using the second third harmonic component removing portion 22 is V2a, and the second output signal V2 before correction is V2b, the second third harmonic component removing portion 22 calculates the corrected signal V2a according to Equation 11 shown below.

$$V1a = V1 \cdot \frac{1}{1 + \frac{4K}{1-K} \cdot (1 - V1b^2)} \quad (10)$$

$$V2a = V2 \cdot \frac{1}{1 + \frac{4K}{1-K} \cdot (1 - V2b^2)} \quad (11)$$

While the example embodiment where the invention is applied to an apparatus that detects the rotation angle of a rotor of a brushless motor has been described, the applications of the invention are not limit to such an apparatus. That is, for example, the invention may be applied also to an apparatus that detects the rotation angle of a rotor other than a rotor of a brushless motor. Further, while the magnet of the rotor 1 has a pair of magnetic poles in the foregoing example embodiment, the rotor 1 may have two or more pairs of magnetic poles.

The invention has been described with reference to the example embodiment for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A rotation angle detection apparatus, comprising:
   a magnet that rotates as a rotor rotates, and that has multiple magnetic poles arranged in a circumferential direction of the magnet;
   a first magnetic sensor that outputs, as the magnet rotates, a sinusoidal signal on which a third harmonic component is superimposed;
   a second magnetic sensor that outputs, as the magnet rotates, a sinusoidal signal on which a third harmonic component is superimposed and of which a phase is different from a phase of the sinusoidal signal output from the first magnetic sensor;
   a third harmonic component removing unit that corrects the sinusoidal signals output from the first magnetic sensor and the second magnetic sensor so as to remove the third harmonic components from the sinusoidal signals; and
   a rotation angle calculating unit that calculates a rotation angle of the rotor based on the sinusoidal signals corrected by the third harmonic component removing unit, wherein
   the third harmonic component removing unit comprises:
   a unit that calculates a post-correction signal V1a of the sinusoidal signal output from the first magnetic sensor according to an equation a; and
   a unit that calculates a post-correction signal V2a of the sinusoidal signal output from the second magnetic sensor according to an equation b, $$V1a = V1 \cdot \frac{1}{1 + \frac{4K}{1-K} \cdot (1 - V1b^2)} \quad (a)$$

$$V2a = V2 \cdot \frac{1}{1 + \frac{4K}{1-K} \cdot (1 - V2b^2)} \quad (b)$$

wherein K is a third harmonic component gain that is larger than zero but smaller than 1 (0<K<1), V1 is the sinusoidal signal output from the first magnetic sensor, V1a is the post-correction signal that is obtained by correcting the output signal V1 using the third harmonic component removing unit, V1b is a pre-correction signal that is the output signal V1 before correction, V2 is the sinusoidal signal output from the second magnetic sensor, V2a is the post-correction signal that is obtained by correcting the output signal V2 using the third harmonic component removing unit, and V2b is a pre-correction signal that is the output signal V2 before correction.

2. The rotation angle detection apparatus according to claim 1, wherein
   the third harmonic component removing unit comprises:
   a unit that calculates the post-correction signal V1a in a final calculation cycle, using the output signal V1 as the pre-correction signal V1b in the equation a; and
   a unit that calculates the post-correction signal V2a in the final calculation cycle, using the output signal V2 as the pre-correction signal V2b in the equation b.

3. The rotation angle detection apparatus according to claim 1, wherein
   the third harmonic component removing unit comprises:
   a unit that calculates the post correction signal V1a in a first calculation cycle, using the output signal V1 as the pre-correction signal V1b in the equation a;
   a unit that calculates the post-correction signal V1a in a final calculation cycle by executing, at least one time, a process in which the post-correction signals V1a in a second calculation cycle and calculation cycles following the second calculation cycle are each calculated using the post-correction signal V1a calculated in an immediately preceding calculation cycle as the pre-correction signal V1b in the equation a;
   a unit that calculates the post-correction signal V2a in the first calculation cycle, using the output signal V2 as the pre-correction signal V2b in the equation b; and
   a unit that calculates the post-correction signal V2a in the final calculation cycle by executing, at least one time, a process in which the post-correction signals V2a in the second calculation cycle and the calculation cycles following the second calculation cycle are each calculated using the post-correction signal V2a calculated in an immediately preceding calculation cycle as the pre-correction signal V2b in the equation b.

4. The rotation angle detection apparatus according to claim 1, wherein
   if the rotation angle of the rotor is θ, the output signal V1 is expressed by an equation c where θ represents the rotation angle of the rotor, and the output signal V2 is expressed by an equation d where θ represents the rotation angle of the rotor, the equation a is an equation e obtained from the equation c, the equation b is an equation f obtained from the equation d, the pre-correction signal V1b corresponds to sin θ in a term $(1-\sin^2 θ)$ in a right side of the equation e, the post-correction signal V1a corresponds to sin θ in a left side of the equation e, the pre-correction signal V2b corresponds to case in a term $(1-\cos^2\theta)$ in a right side of the equation f, and the post-correction signal V2*a* corresponds to $\cos\theta$ in a left side of the equation f $$V1 = \frac{\sin\theta + K \cdot \sin 3\theta}{1 - K} \qquad (c)$$

$$V2 = \frac{\cos\theta - K \cdot \cos 3\theta}{1 - K} \qquad (d)$$

$$\sin\theta = V1 \cdot \frac{1}{1 + \frac{4K}{1 - K} \cdot (1 - \sin^2\theta)} \qquad (e)$$

$$\cos\theta = V2 \cdot \frac{1}{1 + \frac{4K}{1 - K} \cdot (1 - \cos^2\theta)}. \qquad (f)$$

5. The rotation angle detection apparatus according to claim 2, wherein if the rotation angle of the rotor is θ, the output signal V1 is expressed by an equation c where θ represents the rotation angle of the rotor, and the output signal V2 is expressed by an equation d where θ represents the rotation angle of the rotor, the equation a is an equation e obtained from the equation c, the equation b is an equation f obtained from the equation d, the pre-correction signal V1*b* corresponds to $\sin\theta$ in a term $(1-\sin^2\theta)$ in a right side of the equation e, the post-correction signal V1*a* corresponds to $\sin\theta$ in a left side of the equation e, the pre-correction signal V2*b* corresponds to $\cos\theta$ in a term $(1-\cos^2\theta)$ in a right side of the equation f, and the post-correction signal V2*a* corresponds to $\cos\theta$ in a left side of the equation f $$V1 = \frac{\sin\theta + K \cdot \sin 3\theta}{1 - K} \qquad (c)$$

$$V2 = \frac{\cos\theta - K \cdot \cos 3\theta}{1 - K} \qquad (d)$$

-continued $$\sin\theta = V1 \cdot \frac{1}{1 + \frac{4K}{1 - K} \cdot (1 - \sin^2\theta)} \qquad (e)$$

$$\cos\theta = V2 \cdot \frac{1}{1 + \frac{4K}{1 - K} \cdot (1 - \cos^2\theta)}. \qquad (f)$$

6. The rotation angle detection apparatus according to claim 3, wherein if the rotation angle of the rotor is θ, the output signal V1 is expressed by an equation c where θ represents the rotation angle of the rotor, and the output signal V2 is expressed by an equation d where θ represents the rotation angle of the rotor, the equation a is an equation e obtained from the equation c, the equation b is an equation f obtained from the equation d, the pre-correction signal V1*b* corresponds to $\sin\theta$ in a term $(1-\sin^2\theta)$ in a right side of the equation e, the post-correction signal V1*a* corresponds to $\sin\theta$ in a left side of the equation e, the pre-correction signal V2*b* corresponds to $\cos\theta$ in a term $(1-\cos^2\theta)$ in a right side of the equation f, and the post-correction signal V2*a* corresponds to case in a left side of the equation f $$V1 = \frac{\sin\theta + K \cdot \sin 3\theta}{1 - K} \qquad (c)$$

$$V2 = \frac{\cos\theta - K \cdot \cos 3\theta}{1 - K} \qquad (d)$$

$$\sin\theta = V1 \cdot \frac{1}{1 + \frac{4K}{1 - K} \cdot (1 - \sin^2\theta)} \qquad (e)$$

$$\cos\theta = V2 \cdot \frac{1}{1 + \frac{4K}{1 - K} \cdot (1 - \cos^2\theta)}. \qquad (f)$$

* * * * *